United States Patent [19]
Lucero

[11] 3,767,545
[45] Oct. 23, 1973

[54] PROCESS AND APPARATUS FOR REMOVING IONS FROM LIQUIDS

[75] Inventor: Ronald Ray Lucero, Anaheim, Calif.

[73] Assignee: Interface Development Co., Inc., Columbia, S.C.

[22] Filed: June 7, 1971

[21] Appl. No.: 150,599

Related U.S. Application Data

[63] Continuation-in-part of Ser. No. 760,620, Sept. 18, 1968, abandoned.

[52] U.S. Cl.................... 204/155, 204/309, 210/42, 210/222
[51] Int. Cl.......................... B01k 1/00, C10g 33/02
[58] Field of Search............ 204/155, 186, 188–191, 204/193, 309; 250/41.9; 55/3, 100, 137, 138; 210/222, 169, 42; 209/214

[56] References Cited
UNITED STATES PATENTS

| | | |
|---|---|---|
| 3,207,684 | 9/1965 | Dotts, Jr. ............................ 204/309 |
| 3,511,776 | 5/1970 | Avampato............................ 210/222 |
| 3,522,162 | 7/1970 | Davies ................................ 204/180 |
| 3,277,631 | 10/1966 | Sunnen ..................................... 55/3 |
| 3,443,087 | 5/1969 | Robieux et al..................... 250/41.9 |

Primary Examiner—T. Tufariello
Attorney—Edmund M. Jaskiewicz

[57] ABSTRACT

A fluid, including a gas or a liquid, is flowed through a cylindrical enclosure and subjected to ultraviolet radiation to make predetermined ions more susceptible to a magnetic field established within the fluid by a magnet positioned around or within the enclosure. The ions are moved in a vortex motion within the magnetic field so that like ions converge at a focal point from which fluid containing a higher concentration of these ions is removed.

20 Claims, 6 Drawing Figures

PATENTED OCT 23 1973 3,767,545

INVENTOR
RONALD RAY LUCERO

Edmund M. Jaskiewicz
ATTORNEY

PROCESS AND APPARATUS FOR REMOVING IONS FROM LIQUIDS

The present application is a continuation-in-part of application Ser. No. 760,620 filed on Sept. 18, 1968 and now abandoned by the same named applicant.

The present invention relates to the separation and removal of materials from fluids, more particularly, to the separation of ions from gases and liquids including sea water, petroleum hydrocarbons, molten metals, and gases discharged into the atmosphere.

One of the most basic and common functions in present day refinery and petrochemical plants is fractionation or separation. This is accomplished by a process known as the distillation method which is based upon the different boiling points or vaporization temperatures of each fraction. Crude oil, when brought into the refinery, must first be fractionated into its basic components before refining of these various parts can take place. After refining or processing for color, octane, removal of sulfur, and other impurities; these basic fractions are often again separated, sometimes mixed again, and/or processed again for subsequent fractionation. This cyclic processing takes place through as many stages as are necessary, according to the number of units contained in the refinery or petrochemical complex.

A mixture of various hydrocarbons of differing boiling ranges and gravities are separated in a tower having an overhead receiver and a heat source, which vaporizes portions of the mixture to be extracted or fractionated. Rising vapors in the tower cool and condense at some designed area, since a temperature gradient will exist, according to height of tower. The tower is tiered or layered with trays, or some other mechanism to hold liquid and allow rising vapors to pass. As long as heat energy is applied to the tower at some lower point, the design is such that heated vapors are rising constantly and condensed liquid pouring downward; unless it reaches a lower, hotter point, at which point it will return to the vapor state and again rise. Since the tower is hottest at the bottom and coolest at the top, material is drawn off as liquid at the desired level; according to the separation needs, as the various portions tend to be found at a particular heat level. Some material, the lightest or most volatile portions, does not condense and thus passes out at the top of the tower, in a vapor state, to be further cooled by a condensing cooler such as a heat exchanger or a fan, and is then collected in a vessel known as an overhead receiver, to be carrier away as product, returned to the tower as reflux or both. Reflux is one method employed to control heat gradient in the tower. For example, a draw is taken from the tower at one point, cooled and returned at another, usually higher point as reflux for that particular section of the tower. Any number of reflux flows may be employed as needed to maintain the presence of a particular fraction at a desired level in the tower.

Pressure is kept steady or adjusted to control vaporization by a pressure control valve since a change in pressure varies the vaporization rate of the material. Some towers operate at hundreds of pounds per square inch, thus creating many dangers such as line rupture potential, explosions, and other extremely hazardous conditions.

Because of mixing, it is sometimes difficult to get an exact separation and overlap always exists in each fraction taken off as product.

The energy source for this method of separation is heat, usually applied at some low point on the tower; for example, in the form of an actual burner or burners, sometimes as an heat exchanger or reboiler. Most often the incoming material is heated in advance, largely by gas or oil burning furnaces. Occasionally combination methods are used. In the Crude Unit, where the entirety of the incoming crude oil must be fractionated into basic components such as napthenes, kerosene, 2-oil, heavy gas oil, and residual or 6-oil; huge furnace-heaters are employed to bring the many thousands of barrels per day of crude oil to a temperature of 600° to 800° Fahrenheit, before fractionation can be effectively achieved. Such furnace-heaters are dangerous, energy wasting, and air pollutant. They are dangerous because the combustible material burned as fuel, such as various gases and atomized oils cause fires and explosions. Also the tubes which carry the material to be heated can rupture and create very large and difficult to control fires. A great percent of refinery and petrochemical accidents are caused by exploding heaters or heaters burning out of control. They are energy wasting, since a large part of the heat produced passes out of the furnace unused. This unused heat, together with combustion by-products, passes out of the stack, and acts as an air pollutant.

Most of the material carried off, as product or material to be refined, must be cooled below a dangerous temperature for handling. This results in an expenditure of energy for cooling fans, heat exchangers, and pumps. The above, in addition to the fact that, in an ordinary Crude Unit, many refluxes are used which results in a great complexity of structure, increases the possibility of leaks, line ruptures, and equipment breakdowns thusly increasing the likelihood of fire and explosion, since most of the flows are at combustion temperatures and often under high pressure. The same complexity and likelihood of equipment breakdown results in higher maintenance costs and greater requirement of operational watchfulness.

In order to conserve as much energy as possible, much heat is borrowed and traded through heat exchangers in order that incoming material to be heated exchanges with outgoing material to be cooled, and any other area in between; where this may be employed. The results of this is, that a change in flow rate in one section of the system would change heat in some otherwise unrelated portion, and thus a chain reaction through the system brings into play yet another operational imbalance.

It has also been proposed to purify sea water by removing ions from the water as the water flows through a pipe. However, this process was unsatisfactory since in operation the various concentrations of ions were not distinctly defined and tended to overlap each other so that difficulties were encountered in removing like ions from the water. Further, the varying rates of flow of like ions throughout the cross sectional area of the pipe introduced difficulties since the like ions positioned adjacent the walls of the pipe tended to flow at slower rates of speed than the ions in the center of the pipe and this resulted in problems in the separation of like ions.

Difficulties were also encountered in the purification of sea water by the removal of ions from the water as the water flows through a pipe since the charge on the ions lasts for a very short duration of time. A large number of ions lost their charge by the time they arrived in the magnetic field since it had been proposed to radiate the water with electromagnetic energy and then pass the water through a magnetic field. The magnetic field, however, was not of sufficient length to concentrate a sufficient quantity of like ions. As a result, such a low proportion of ions were removed that the results of such a process were extremely unfavorable.

It is known that hydrocarbons, and other substances including water and gases, if subjected to an ionizing potential so that they are ionized or broken into charged submolecular fragments, then directed through a magnetic field, will separate according to mass. Each species of molecule under this influence produces a unique mass-distribution pattern.

With the advent of cryogenics and thus superconductivity, it is now possible to design magnets of extemely high field strength for continuous operation. This makes possible the use of the above mentioned principle on a larger scale than ever before.

The use of this method of separation to replace the distillation method of fractionation offers improvements such as economy of energy, lower maintenance cost, safety of operation, simplicity of operation, and an improved fractionation.

Economy of energy would be improved through the elimination of the waste of powerful heaters and through the elimination of heat exchangers, reflux, and their attendant requirements of pumping energy. A cryomagnet, employing the principles of superconductivity, once energized, needs no input of electrical energy to maintain magnetic flux indefinitely. Therefore, the only large amount of energy required in the present process is the necessary ionizing energy in the form of electrical potential to charge the hydrocarbons to be fractionated.

Lower maintenance cost would be achieved by applicant's process through simplification of apparatus such as reduction or elimination of the following: heaters, heat exchangers, reflux, complexity of structure, many pumps, and pressure requirements. All of these require constant repair, care, and attention. The present process requires little or none of these things.

Safety of operation would be offered by the present process by the reduction of the possibility of explosion, in that it requires neither heater nor pressure. Through simplicity of structure, the possibility of leaks and line rupture are aso reduced. Further, this method would decrease air pollution by the elimination of furnace-heaters.

Simplicity of operation is improved in the present process through simplification of structure. The basic proposed operation of the present process is adjustment of ionizing potential and adjustment of magnetic flux density, and configuration.

The present process utilizes the principle, that, if the material to be separated is first acted upon by electrical potential so that it, the material, is either ionized or broken into charged submolecular fragments and then directed through a magnetic field, each species of molecule, i.e., each component will manifest a unique distribution pattern in the magnetic field, depending on its mass. The present process would then draw off these components or fractions by vents placed according to the distribution pattern. Therefore, an improvement in fractionation itself would be achieved by the use of molecular separation, since it is a finer and more discriminate separation than boiling range.

It is known that the conductivity of certain hydrocarbons can be increased up to $10^8$ by exposure to intense ultraviolet radiation. This is considered as useful to this process to aid in ionization. Also laser application of radiation is considered as an ionization aid.

A solenoid-type magnet is believed to be of best use to the present process, since its magnetic flux lines arrange in concentric formation through the bore of the magnet; thus arranging concentric separation rings from which the fractions of material could be drawn off as a continuous flow by the properly arranged flow path. Also, a spinning magnet and/or spinning magnetic flux would cause the magnetic flux lines to pass through more material in a given amount of time as well as add a slight centrifugal force to the remainder of the material. A rotation of magnetic flux alone can be achieved by an arrangement of switches.

The imposition of a second magnetic field designed to pulse and thus direct or drag material into position is considered a possible application of flux configuration.

A multi-stage application of ionization and subsequent magnetic field offers to the present process advantages of efficiency.

It is therefore the principal object of the present invention to provide a novel and improved process and apparatus for the removal of ions from gases and liquids.

It is another object of the present invention to provide a process and apparatus for the purification of sea water by removing ionized salt particles therefrom.

It is a further object of the present invention to provide a process and apparatus for removing pollutants from gases discharged into the atmosphere by the ionization of the pollutants as the gases flow through the stack.

The objects of the present invention can be obtained and the disadvantages of the prior art as discussed above can be eliminated by the disclosed process and apparatus. The present invention essentially discloses a process for removing like substances from a fluid wherein there is radiated into the fluid electromagnetic energy of wave lengths substantially within the spectrum of ultraviolet and up to the visible range to make like ions of material in the fluid more susceptible to a magnetic field. A vortex motion is induced in the fluid to recycle the ionized particles therein. The radiated fluid while undergoing a vortext motion is passed through a substantially cylindrical magnetic field so that like ionized particles converge at a focal point within the magnetic field. Fluid is then removed at the focal point of the ions whereby fluid of higher ion concentration is separated from fluid of lower ion concentration.

The process of the present invention may be carried out by an apparatus which comprises means for establishing a substantially cylindrical magnetic field such as that established by a solenoid magnet and means for flowing a fluid through the magnetic field. There are means for radiating the fluid within the cylindrical magnetic field with energy of wave lengths substantially within the spectrum of ultraviolet and up to the visible range to make like ions in the fluid more susceptible to a magnetic field. Means are provided for inducing a vortex motion in the radiated fluid whereby the ions converge at a focal point within the magnetic field. At the focal point there is provided means for removing fluid having a higher ion concentration.

The fluid may be flowed through an enclosure and a cylindrical magnet may be positioned around the enclosure or within the enclosure to establish the cylindrical magnetic field therein.

The fluid may also be in the form of gases which are passed through a tubular member, such as a stack or exhaust, with the stack containing an enlarged chamber in which the fluid is moved in a vortex motion through a magnetic field while being radiated with electromagnetic energy.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
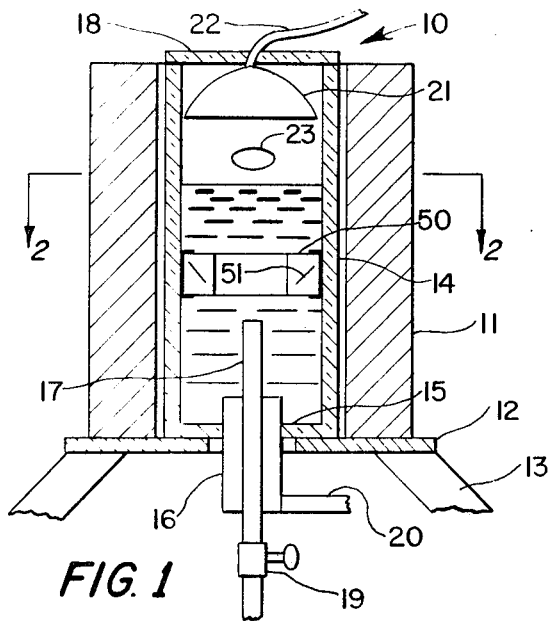
FIG. 1 is a vertical sectional view of one embodiment of the apparatus according to the present invention.

In FIG. 1 there is shown one embodiment of the apparatus of the present invention indicated generally at 10 and comprising a cylindrical permanent magnet 11 whose height is about twice that of its outer diameter and mounted upon a base 12 supported upon suitable legs 13. The magnet 11 may be permanent, such as an Alnico 5–7, or may be an electromagnet. The magnet should generate a high magnetic field strength through bore thereof such as in an example of the present apparatus wherein a permanent cylindrical magnet 11 7 inches long had a magnetic field strength of 750 gauss through its bore. However, it is apparent that different magnetic field strengths can be obtained by different sizes and types of magnets.

Wtihin the bore of the magnet there is positioned a cylindrical container 14 of polystyrene for containing a liquid which for illustrative purposes may be salt water. The bottom of the container 14 is provided with a central opening 15 within which are positioned an outer concentric drain member 16 and an inner concentric drain member 17. The top of the container 14 may be covered by a removable lid 18.

The inner concentric drain tube 17 is mounted for vertical sliding movement with respect to the enclosure and is provided with a valve 19. The outer drain 16 has an outlet 20 which may be connected to a suitable reservoir.

Mounted within the enclosure 14 is a source of electromagnetic energy which may comprise an ultraviolet hydrogen discharge lamp 21 of about 40–60 watts connected to a suitable source of electrical energy by leads 22. The wave lengths of the electromagnetic energy may range from that of ultraviolet light at about 1,800 angstrom units A. up to the visible range (4,000–7,000 A. units).

Figure 2:
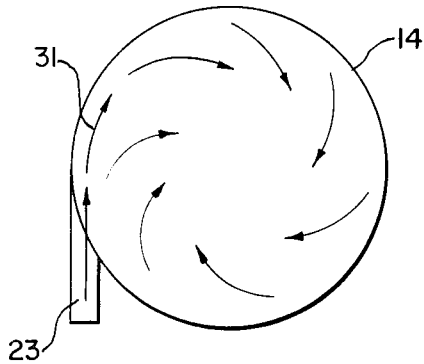
FIG. 2 is a diagrammatic sectional view taken along the line 2—2 of FIG. 1 and showing in a top plan view the vortex motion of the particles within the enclosure.

Liquid is introduced into the container 14 through a tangentially arranged inlet 23 which is more clearly shown in FIG. 2.

An agitator or stirrer 50 having blades 51 may be positioned within the enclosure 14 adjacent the cylindrical surface to stir the water to initiate a vortex action therein. In a small scale apparatus the vortex motion may be induced by manual stirring of the liquid.

Figure 1A:
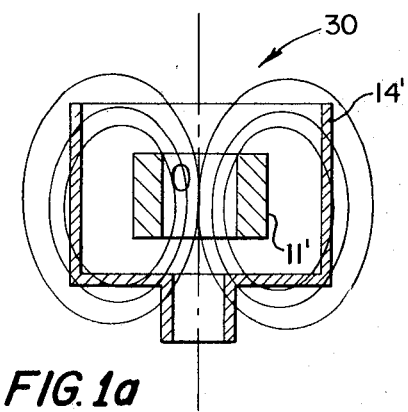
FIGS. 1a and 1b are diagrammatic views of portions of the disclosed apparatus showing other positions and shapes of the magnet.

As may be seen in FIG. 1a, a cylindrical magnet 11' may be positioned within the enclosure 14' to establish a cylindrical or toroidal shaped magnetic field as indicated at 30. Such a cylindrical magnetic field will also be established through the enclosure 14 of FIG. 1 by the cylindrical magnet 11.

Figure 1B:
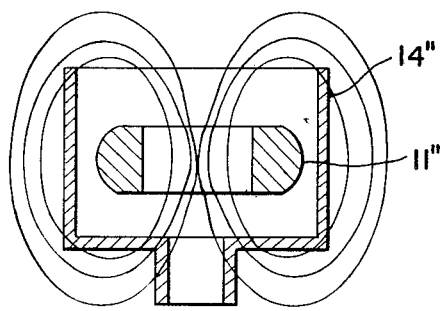

The cylindrical magnet may also have its outer surface curved outwardly so as to have a cross section as seen at 11'' in FIG. 1b. In such an arrangement the magnet is also placed within the enclosure 14''. The magnet 11'' will also establish a cylindrical magnetic field which is essentially toroidal shaped but there will be a greater concentration of magnet flux in a relatively small area within the bore of the cylindrical magnet 11'' which will assist the movement of the ions to their focal point.

Figure 3:
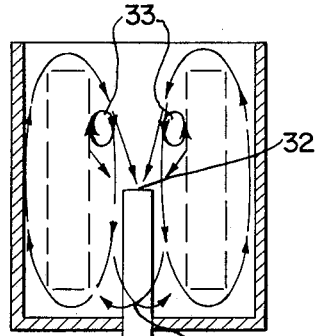
FIG. 3 is a diagrammatic vertical sectional view of the apparatus of FIG. 1 and showing in an elevational view the vortex motion of ions within the enclosure.

In carrying out the process of the present invention for example to remove salt ions from a saline water utilizing the apparatus as described above, saline water having a salt concentration of 3½ percent which is approximately equal to sea water is introduced into the container 14 through the tangential inlet 23 to form a vortex and substantially fill the container which is maintained at room temperature and atmospheric pressure. The circulation of the sea water will establish a vortex motion in the direction of the arrow 31 as shown in FIG. 2. The vortex motion also includes a vertical eliptical movement of the water as shown in FIG. 3 which is a characteristic of vortex motion. In effect, there is obtained a toroidal shaped body of sea water moving downwardly at the center thereof while at the same time moving circumferentially, i.e., along a circular path. In the event a tangential inlet is not employed the vortex motion can be initiated by agitating or stirring the water with a suitable agitator or by introducing the liquid as a jet into the enclosure along its central longitudinal axis.

After the container has been filled, about one quarter to one third of the contents of the water is drained through the drain 17. This draining of the water from the center of the enclosure will also assist in establishing the vortex movement of the water within the container as indicated by the direction arrows in FIG. 3. Where the magnet is of sufficient length a plurality of vortex movements may be established within the bore of the magnet such as indicated at 33 in FIG. 3.

The water within the enclosure is then subjected to electromagnetic radiation which can be in the ultraviolet or the X-ray spectrum up to the range of visible light. The wave length may be somewhat beyond the spectrums in either direction and may constitute a band embracing a number of wave lengths. Theoretically, there is a preferred wave length for the ions of each substance that is to be removed from the water or that is to be concentrated. However, if desired, the radiant energy can be applied to a number of substances simultaneously.

The radiation into the fluid of the electromagnetic energy changes the charge on the ions in the water by stripping electrons from the ions and reducing the ions to a higher degree of ionization potential. The intensity of the radiant energy must be controlled to prevent electrons which have been removed from attaching themselves to the more positively charged ions. The movement of the electrons will be opposite in direction to that of the ions and a suitable structure may be included in the enclosure to remove the electrons. By varying the charge on the ions in the water being treated, these ions in the salt will be more susceptible to a magnetic field.

Where salt is being removed from the water a wave length of radiant energy would be selected to make the sodium and cloride ions more susceptible to magnetic attraction.

Concurrently with the radiation of the ions within the sea water the ions are circulated in a vortex motion as illustrated in FIGS. 2 and 3 within a substantially cylindrical magnetic field established within the water by the magnet 11. The like ions traveling through the bore of a cylindrical magnetic field as established by a solenoid magnet will periodically pass through focal points along the approximate center of the magnetic field. Such a focal point is indicated at 32 in FIG. 3. In the event the magnetic field is sufficiently long the ions will also focus at a subsequent point 32'. Each ion will follow a spiral or helical path as it travels between focal points along the center of the magnetic field. As the ions circulate within the enclosure as shown in FIGS. 2 and 3 they will tend to focus at the focal point 32 as the charge on each ion is sufficiently varied. Where the ion is located at a point remote from the focal point 32 it is possible that the ion will lose its charge before arriving at the focal point. In such an event the ion will then continue to be recycled as shown in FIG. 3 until the ion receives a sufficient charge to cause it to pass through the focal point 32.

The inner drain 17 which is slideable within the enclosure is then positioned so that its upper end is at the focal point 32. Accordingly, the water having the higher ion concentration will be removed from the enclosure through the drain 17 as the ionized particles pass through the focal point 32. The water of lower concentration may be removed through the outer concentric drain 16 either continuously or periodically.

The liquid level within the container remains substantially constant by adjusting the rate of outflow to be substantially constant to the rate of in flow. Maintaining the liquid level constant will fix the focal point of the ions within the liquid and will facilitate the positioning of the drain 17 at the focal point.

Based upon preliminary experiments conducted with the apparatus as described above with sea water and carrying out the present process approximately 2–7 percent of the salt has been removed from the sea water while the water is moving continuously through the enclosure as described above at a rate of about 0.33 gal./min. The quantity of salt removed was determined by measuring the salt content in the water at the top of the enclosure and in the water removed through the drain 17.

The efficiency of the process can also be increased to the point where 30–45 percent of the salt is removed by closely regulating the flow of water through the enclosure, by selecting a wave length of electromagnetic energy which produces the maximum change in charge on the ions of the material which is sought to be removed, by the use of lasers, microwaves or other radiation sources, and by positioning and structuring the movable drain for the most effective removal of the ions.

While only two drains have been shown in the apparatus in FIG. 1 it is pointed out that additional drains may be used with these drains being positioned at the different focal points of several different ions which are being removed from a fluid.

The process as described above may also be carried out with the apparatus of FIG. 1 as a batch process wherein a quantity of liquid is introduced into the enclosure and recirculated within the container until all of the possible ions have been removed. Such a process would require the gradual downward movement of the drain 17 to coincide with the changing focal point of the ions resulting from the lowering of the level of liquid of the enclosure.

Figure 1C:
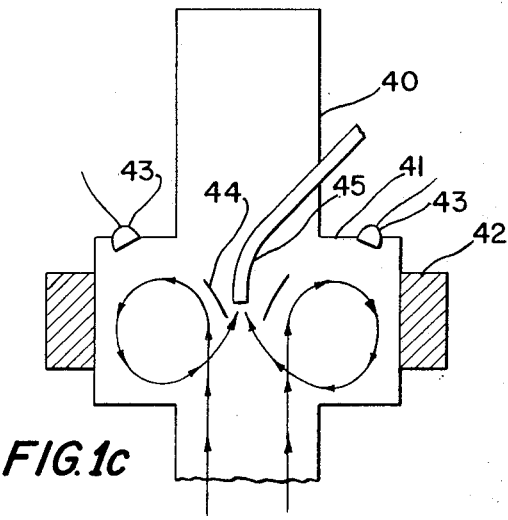
FIG. 1c is a diagrammatic view showing the apparatus of the present invention incorporated in a stack or exhaust.

The apparatus of FIG. 1 may also be used for the removal of ions from gases. A form of apparatus particularly adapted for the removal of ions from gases such as impurities and pollutants from stack gases, is illustrated in FIG. 1c. A stack as indicated at 40 has an enlarged portion 41 around which is positioned a magnet 42. Sources of electromagnetic radiation are positioned at 43 and baffles 44 may be provided within the stack to induce a vortex motion of the gases as indicated in FIG. 1c. Ions would be removed through a removable tube 45 positioned substantially as shown in FIG. 1c.

The apparatus as shown in FIG. 1c may be applied to a wide variety of tubular exhausts including exhaust pipes for automobiles and stacks through which are discharged gaseous products of manufacturing processes. The removal of various ions from these gaseous discharges would be effective in reducing pollution of the atmosphere.

The present invention can also be applied to the purifying of water wastes discharged into bodies of water to reduce water pollution.

The present invention may also be used in metal refining such as in capturing of rare earths and exotic metals which are dissipated in gaseous form during a metals refining process. A laser may be used to vaporize the metals. The metal vapors are then ionized while circulated in a vortex motion in a cylindrical magnetic field.

With the present invention, impurities may be removed from petroleum including metals in trace amounts, sulfur, sulfur compounds, nitrogen and nitrogen compounds.

Thus it can be seen that the present invention has disclosed an apparatus and process for the removal of ions from a gas or liquid by radiating the ions while simultaneously circulating the ions within a cylindrical magnetic field in a vortex motion. Thus, two concepts are involved in the present invention, namely, like ionized particles will focus at a point within a solenoid magnet, and a vortex motion is superimposed on the ionized particles to recycle the ions. While several specific applications of the present invention have been described above it is pointed out that the invention can be employed essentially to remove impurities or other desired materials from gases or liquids.

It is understood that this invention is susceptible to modification in order to adapt it to different usages and conditions and, accordingly, it is desired to comprehend such modifications within the invention as may fall within the scope of the appended claims.

What is claimed is:

1. In a process of removing ionized particles from a liquid, the steps of radiating into the liquid electromagnetic energy of a wave length to increase the attraction of like ions in the liquid to a magnetic field, inducing a vortex motion of the ionized particles to recycle the ions, passing the radiated liquid continuously through a substantially cylindrical magnetic field having a high magnetic field strength therethrough whereby like ionized particles converge at a focal point within the magnetic field, and removing liquid at the focal point of the ions whereby liquid of higher ion concentration is separated from liquid of lower ion concentration, said process being carried out at room temperature and atmospheric pressure.

2. In a process as claimed in claim 1 wherein the wave lengths of the electromagnetic energy are substantially within the spectrum of ultraviolet and up to the visible range.

3. In a process as claimed in claim 1 wherein liquid is introduced into a container.

4. In a process as claimed in claim 3 wherein the liquid is introduced tangentially to a cylindrical container to induce the vortex motion.

5. In a process as claimed in claim 1 and the step of stirring the liquid to induce the vortex motion.

6. In a process as claimed in claim 3 and continuously introducing and draining the liquid from the container.

7. In a process as claimed in claim 1 and removing the liquid having a low ion concentration.

8. In a process as claimed in claim 1 wherein the electromagnetic energy has varying wave lengths corresponding to the ions of different materials which are to be separated.

9. In a process as claimed in claim 8 and removing liquids of different ion concentration at a plurality of focal points.

10. In a process as claimed in claim 1 wherein said liquid is salt water.

11. In an apparatus for removing like materials from a liquid, the combination of means for establishing a substantially cylindrical magnetic field, means for radiating the liquid within the magnetic field with electromagnetic energy of a wave length to increase the attraction of like ions to a magnetic field, means for circulating the radiated liquid in a vortex motion so that the ions converge at a focal point within the magnetic field, and tubular means at said focal point for removing liquid of higher ion concentration.

12. In an apparatus as claimed in claim 11 and comprising an enclosure within which the liquid is circulated.

13. In an apparatus as claimed in claim 12 wherein said enclosure comprises a cylindrical container.

14. In an apparatus as claimed in claim 12 and comprising a drain on said enclosure for the removal of low ion concentration therefrom.

15. In an apparatus as claimed in claim 13 and comprising a drain at the bottom of a cylindrical container, and means on a side wall of said cylindrical container positioned at a tangent thereof for introducing liquid therein.

16. In an apparatus as claimed in claim 12 and comprising a source of electromagnetic energy within the enclosure.

17. In an apparatus as claimed in claim 12 and comprising magnetic field establishing means surrounding said enclosure.

18. In an apparatus as claimed in claim 12 and comprising magnetic field establishing means within the enclosure.

19. In an apparatus as claimed in claim 12 wherein the length of the disclosure is sufficient so that a plurality of focal points of like ions are established, and removal means at each focal point.

20. In an apparatus as claimed in claim 18 wherein said magnetic means comprises a tubular element having a convex curve of the outer surface in cross section.

* * * * *